Dec. 7, 1954  H. A. SWAN  2,696,123
BELT ADJUSTING AND TENSIONING DEVICE
Filed Aug. 25, 1950
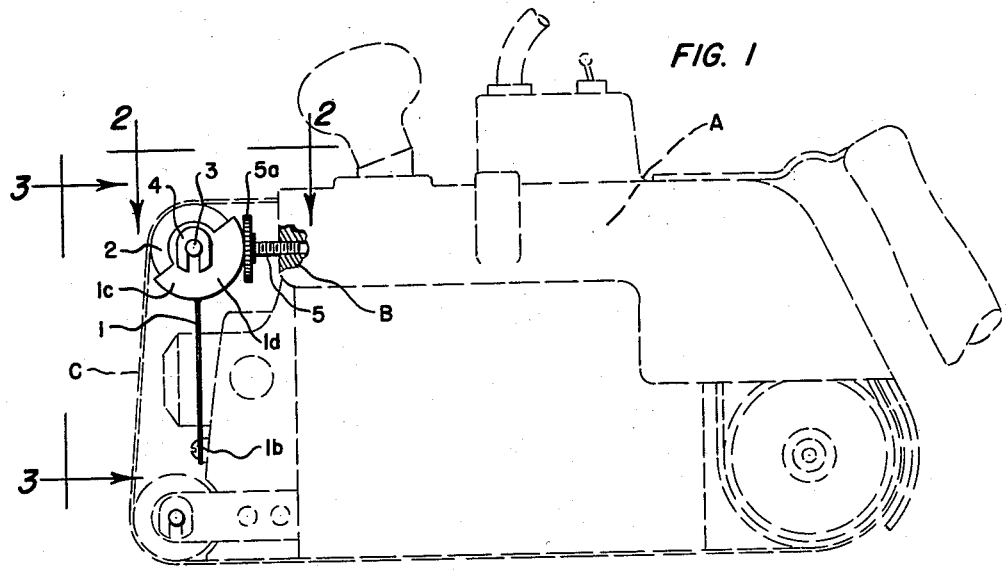
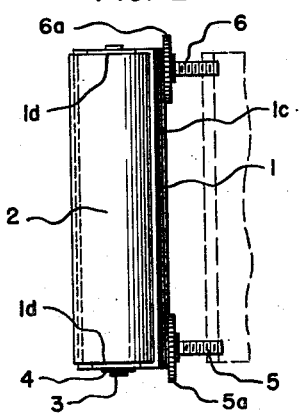
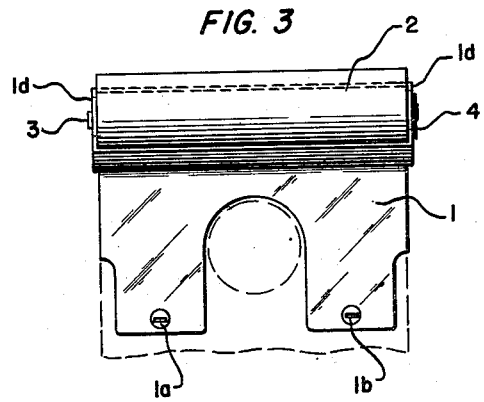
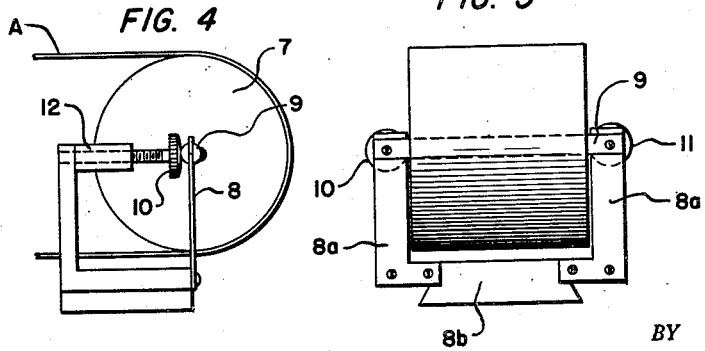
INVENTOR.
HAROLD A. SWAN
BY
Wm. H. Dean
AGENT

2,696,123

BELT ADJUSTING AND TENSIONING DEVICE

Harold A. Swan, Coronado, Calif.

Application August 25, 1950, Serial No. 181,397

5 Claims. (Cl. 74—242.11)

My invention relates to a belt adjusting and tensioning device, more particularly for use in supporting and aligning moving endless belts, and the objects of my invention are:

First, to provide a device of this class which may be used in a large variety of machinery wherein endless belts are operated, and more particularly in connection with belt sanders or the like, as disclosed in my issued Patent No. 2,178,865, for Abrading and Blackboard Cleaning Machine, issued November 7, 1939;

Second, to provide a device of this class having a unitary resilient roller support which may be resiliently deflected near opposite ends of a roller rotatably mounted thereon, whereby facility in the adjustment of running endless belts is promoted;

Third, to provide a device of this class which may be used in connection with belt sanders, or the like, wherein a single resilient mount for the belt-supporting idler may be adjusted by a pair of screws spaced relative to each other longitudinally of the axis of the roller, and engaging the support therefor;

Fourth, to provide a device of this class which provides a certain amount of resilience in the support of endless running belts, whereby extreme adjustment may be slightly cushioned, preventing excessive tension in the belt throughout a certain degree of over-adjustment;

Fifth, to provide a device of this class which flexes readily laterally of the axis of the roller thereof, near either end of said roller, whereby ease of adjustment of either of the screws adjacent either end of the roller is inherent therein; and Sixth, to provide a belt adjusting and tensioning device of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of my belt adjusting and tensioning device, shown in connection with a conventional belt sander, illustrated substantially in dash lines; Fig. 2 is a fragmentary top or plan view of said sander, showing my belt adjusting and tensioning device in connection therewith; Fig. 3 is a front elevational view of my belt adjusting and tensioning device, showing by dash lines a fragmentary portion of a belt sander; Fig. 4 is a side elevational view of a modified form of my belt adjusting atnd tensioning device; and Fig. 5 is a view of the structure shown in Fig. 4, taken substantially ninety degrees to the structure as shown in Fig. 4.

Similar characters of reference refer to similar parts and portions throughout the several views of the drawings.

The resilient roller support 1, roller 2, axle 3, clip 4, and adjusting screws 5 and 6, constitute the principal parts and portions of the structure shown in Figs. 1 to 3, inclusive, of the drawings.

The conventional belt sander A, illustrated by dash lines in Fig. 1 of the drawings, is similar to the one disclosed in my issued patent hereinbefore referred to. Screw-threaded in the frame B of said belt sander A are the screws 5 and 6, which are provided with knurled enlarged heads 5a and 6a, adapted to be engaged by the fingers of a person's hand for adjusting the same. The resilient roller support 1 is preferably a flat resilient plate, secured to the frame B of the sander A by means of the screws 1a and 1b, as shown best in Figs. 1 and 3 of the drawings. This resilient roller support 1 is a thin metal plate, and secured thereto is an arcuate in cross-section holder 1c, having partially enclosed ends 1d, through which the ends of the axle 3 extend. One end of the axle 3 is provided with a head portion, and the opposite end thereof is secured by the conventional U-shaped clip 4.

The roller 2 on the axle 3 is engaged by the conventional sander belt C, and the heads 5a and 6a of the adjusting screws 5 and 6 bear on the arcuate in cross-section roller holder 1c, below the belt C at its upper horizontal portion, as shown in Fig. 1 of the drawings.

The operation of my belt adjusting and tensioning device, as shown in Figs. 1 to 3, inclusive, of the drawings, is substantially as follows:

When the belt C is engaged with the roller 2, the screws 5 and 6 may be screw-threadably adjusted in order to place the roller 2 in certain axial alignment with the driving roller of the sanding machine A. These screws 5 and 6 may also be adjusted in unison with each other in order to place the proper tension in the belt C, and the resilience of the plate 1 permits angular deflection thereof in order to support the roller 2 in certain axial alignment with the remaining rollers of the sanding machine over which the endless belt C passes.

When it is desired to cause running movement of the edge of the belt in one direction or the other, either the screw 5 or the screw 6 is accordingly adjusted outwardly, forcing one end of the roller 2 outwardly, so that the resilience of the plate 1 acts as a support and readily compensates for the angular adjustment of the roller 2 by means of its resilience.

In the modification as shown in Figs. 4 and 5 of the drawings, the parts are designated as follows: The roller 7, resilient support 8, axle 9, adjusting screws 10 and 11, and the nuts 12.

The modified structure shown in Figs. 4 and 5 is particularly adapted for use in connection with conventional table sanders or the like. The roller 7 is an idler roller, over which the flexible abrasive belt A passes, and this roller 7 is mounted on an axle 9, which is supported on the resilient arm portions 8a, which are secured stationarily to the intermediate member 8b, which may be stationarily supported on the frame of a conventional table sander. The nuts 12 are internally screw-threaded nuts, in which the screws 10 are screw-threadably adjustably mounted, and these screws 10 and 11 engage the axle 9 near its opposite ends, providing for the angular adjustment of the axis of the roller 7, in order to properly locate and tension the belt A in its endless travel over the roller 7.

Though I have shown and described a particular construction, combination and arrangement of parts and portions, and a certain modification, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a belt adjusting device, the combination of: an elongated frame having spaced rollers mounted thereupon; an endless belt operatively engaging said rollers; a flat, resilient vertically oriented plate secured adjacent its lower end to said frame internally of said belt, said plate being movable bodily in a direction toward or away from said frame and torsionally about its vertical axis and being of a width substantially equal to one of said rollers; laterally spaced bearings secured to said plate for rotatably supporting said one roller; and adjusters mounted in said frame internally of said belt and operable individually to rotate one end of said one roller in a horizontal plane and concomitantly to move both ends of said roller toward or away from said frame.

2. In a belt adjusting device, the combination of: an elongated frame having spaced rollers mounted thereupon; an endless belt operatively engaging said rollers; a flat, resilient, vertically oriented plate secured adjacent its lower end to said frame internally of said belt, said plate being movable bodily in a direction toward or away from said frame and torsionally about its vertical axis and being of a width substantially equal to one of said rollers; a roller container secured to the upper end of said plate having bearings in its opposite ends for supporting said one roller; and adjusters mounted in said frame internally of said belt and operable individually against said container at points spaced from said bearings to rotate one end of said one roller in a horizontal plane and concomitantly to move both ends of said roller toward or away from said frame.

3. In a belt adjusting device, the combination of: an elongated frame having spaced rollers mounted thereupon; an endless belt operatively engaging said rollers; a flat, resilient, vertically oriented plate secured adjacent its lower end to said frame internally of said belt, said plate being movable bodily in a direction toward or away from said frame and torsionally about its vertical axis and being of a width substantially equal to one of said rollers; a roller container of arcuate cross-sectional configuration secured to the upper end of said plate having bearings in its opposite ends for supporting said one roller; and adjusters mounted in said frame internally of said belt and operable individually against said container at points spaced from said bearings to rotate one end of said one roller in a horizontal plane and concomitantly to move both ends of said roller toward or away from said frame.

4. In a belt adjusting device, the combination of: an elongated frame having spaced rollers mounted thereupon; an endless belt operatively engaging said rollers; a resilient plate secured to said frame adjacent one end; a housing for one of said rollers mounted on the other end of said plate and having bearing means in its opposite ends for rotatably mounting said one roller; and adjusters mounted on said frame and operative individually against said housing at points spaced from said bearings to rotate one end of said roller in a horizontal plane and concomitantly to move both ends of said roller toward or away from said frame.

5. In a belt adjusting device, the combination of: an elongated frame having spaced rollers mounted thereupon; an endless belt operatively engaging said rollers; a resilient plate secured to said frame adjacent one end internally of said belt; a housing for one of said rollers mounted on the other end of said plate and having bearing means in its opposite ends for rotatably mounting said one roller; and adjusters mounted on said frame internally of said belt and operative individually against said housing at points spaced from said bearings to rotate one end of said one roller in a horizontal plane and concomitantly to move both ends of said roller toward or away from said frame.

References Cited in the file of this patent

UNITED STATES PATENTS

| Number | Name | Date |
| --- | --- | --- |
| 782,978 | Magruder | Feb. 21, 1905 |
| 805,748 | Pfanschmidt | Nov. 28, 1905 |